(12) United States Patent
Zevenbergen et al.

(10) Patent No.: US 10,895,548 B2
(45) Date of Patent: Jan. 19, 2021

(54) REFERENCE ELECTRODE WITH A PORE MEMBRANE

(71) Applicant: Stichting IMEC Nederland, Eindhoven (NL)

(72) Inventors: Marcel Zevenbergen, Nuenen (NL); Geert Altena, Eindhoven (NL); Pawel Bembnowicz, Waalre (NL); Martijn Goedbloed, Aachen (DE)

(73) Assignee: IMEC VZW, Leuven (BE)

(*) Notice: Subject to any disclaimer, the term of this patent is extended or adjusted under 35 U.S.C. 154(b) by 590 days.

(21) Appl. No.: 15/133,475

(22) Filed: Apr. 20, 2016

(65) Prior Publication Data

US 2016/0320326 A1 Nov. 3, 2016

(30) Foreign Application Priority Data

Apr. 30, 2015 (EP) .................................... 15166085

(51) Int. Cl.
*G01N 27/30* (2006.01)
*G01N 27/413* (2006.01)
*G01N 27/416* (2006.01)

(52) U.S. Cl.
CPC .......... *G01N 27/301* (2013.01); *G01N 27/413* (2013.01); *G01N 27/4163* (2013.01)

(58) Field of Classification Search
CPC ............... G01N 27/301; G01N 27/413; G01N 27/4163; G01N 27/4117; G01N 27/4035; G01N 27/302; G01N 27/40
See application file for complete search history.

(56) References Cited

U.S. PATENT DOCUMENTS

| 6,054,031 A * | 4/2000 | Benton .................. G01N 27/40 204/416 |
| 6,616,821 B2 * | 9/2003 | Broadley ............. G01N 27/401 204/408 |
| 8,551,311 B2 * | 10/2013 | Woodward ............. G01N 27/36 204/400 |
| 2001/0032785 A1 * | 10/2001 | Cha ...................... G01N 27/301 204/435 |

(Continued)

FOREIGN PATENT DOCUMENTS

EP 3 035 044 A1 6/2016

OTHER PUBLICATIONS

Herbert et al. JACS, 1947, 69, 736-740 (Year: 1947).*

(Continued)

*Primary Examiner* — Gurpreet Kaur
(74) *Attorney, Agent, or Firm* — McDonnell Boehnen Hulbert & Berghoff LLP

(57) ABSTRACT

Systems and methods described herein include a reference electrode for being immersed in a bulk solution. The reference electrode comprises a reservoir having reservoir walls defining a reservoir volume filled with an electrolyte; an electrode in the reservoir, in contact with the electrolyte. The reservoir of the reference electrode is closed except for the presence of at least one pore in at least one of the reservoir walls, the at least one pore being filled with electrolyte and being adapted for allowing ionic contact between the electrolyte in the reservoir and the bulk solution into which the reference electrode is to be immersed.

9 Claims, 11 Drawing Sheets

(56) References Cited

U.S. PATENT DOCUMENTS

| | | | | |
|---|---|---|---|---|
| 2010/0038237 A1* | 2/2010 | Wen | ................... | G01N 27/4035 |
| | | | | 204/284 |
| 2011/0308947 A1* | 12/2011 | Wilke | .................. | G01N 27/403 |
| | | | | 204/414 |
| 2013/0248381 A1* | 9/2013 | Wilhelm | ................ | G01N 27/30 |
| | | | | 205/789 |
| 2013/0270125 A1* | 10/2013 | Lobbert | ............. | G01N 27/4163 |
| | | | | 205/793 |

OTHER PUBLICATIONS

Simonis, Anette et al., "Miniaturised Reference Electrodes for Field-Effect Sensors Compatible to Silicon Chip Technology", Electrochimica Acta, vol. 51, 2005, pp. 930-937.

\* cited by examiner

REFERENCE ELECTRODE WITH A PORE MEMBRANE

CROSS-REFERENCE TO RELATED APPLICATIONS

The present application is a non-provisional patent application claiming priority to European Patent Application No. EP 15166085.9, filed Apr. 30, 2015, the contents of which are hereby incorporated by reference.

FIELD OF THE DISCLOSURE

The present disclosure relates to the field of electrochemical sensors. More specifically it relates to reference electrodes with a limited, e.g. minimized, drift.

BACKGROUND

Potentiometric sensors are used for detecting chemical or biochemical compounds in a solution. Such potentiometric sensors are electrochemical sensors that generate voltages that scale with the concentration of an ion to be determined. A pH sensor is an example of such a potentiometric sensor. A potentiometric sensor usually comprises an ion-selective electrode and a reference electrode. The reference electrode has a potential which can be used as a reference potential for the ion-selective electrode. The potential difference between the ion-selective electrode and the reference electrode is a measure for the concentration of the compound for which the ion-selective electrode is sensitive. An important requirement is that the potential of the reference electrode is stable and constant.

In operation, the reference electrode is immersed, together with the ion-selective electrode, in the solution under test. For proper operation, the potential of the reference electrode should be independent of the solution composition.

A commonly used type of reference electrode is a silver chloride electrode (Ag/AgCl). This electrode has a fixed potential when in contact with a reservoir with a fixed chloride concentration (e.g. 3 Molar KCl). An example of such a reference electrode is shown in FIG. 1. FIG. 1 shows a reference electrode comprising an Ag/AgCl wire 110, immersed in a reservoir 120 containing a predetermined chloride concentration, for instance 3 Molar KCl (the reference electrolyte solution). An electrolyte bridge or a porous ceramic plug separates the reference electrolyte solution from the solution which needs to be measured. In the exemplary reference electrode of FIG. 1 the electrolyte bridge is a porous frit (salt bridge) 130 separating the inner reservoir 120 from the bulk solution. Ions can still pass through this junction; therefore an ionic contact forms. The potential of the Ag/AgCl electrode depends on the chloride concentration in the reference electrolyte solution. The electrolyte bridge or the porous ceramic plug 130 prevents that chloride ions instantaneously migrate between the liquid of the reference electrode and the bulk solution. If the reference electrode is immersed in a solution with different chloride concentration, chloride ions will leach through the electrolyte bridge. Depending on the volume of the reference electrolyte solution these migrations will cause the chloride concentration in the reference electrolyte solution to change, thereby changing the reference voltage (drift). As the reservoir is rather large in the example of FIG. 1, drift is limited. One way of stabilizing the reference voltage is to increase the volume of the reference electrolyte solution. This is, however, not possible in microfabricated reference electrodes since the size is, per definition, limited in these electrodes.

Microfabricated reference electrodes typically comprise a planar electrode, made by photolithography or screen-printing techniques covered by a hydrogel such as agarose or polyhydroxyethylmethacrylate (pHEMA). An example developed by Simonis et. al. "Miniaturised reference electrodes for field-effect sensors compatible to silicon chip technology", Electrochimica Acta 51, volume 51, issue 5, 10 Nov. 2005, pages 930-937, is shown in FIG. 2. FIG. 2 shows a printed circuit board 216 comprising a stack of a silicon layer 222, covered with a SiO2 layer 220, covered with an Ag/AgCl layer 218. The Ag/AgCl layer 218 is covered by a hydrogel 214 which comprises KCl, for instance agarose (agar)+KCl or polyhydroxymethylmethacrylate (pHEMA)+KCl. The hydrogel layer 214 is sealed with a PVC layer 210 and the PVC layer is covered with a nafion or cellulose nitrate layer 212.

The covered hydrogel layer 214, 210 is sealed at its sidewalls by means of a sealing (e.g. an O-ring) 208. The sealing 208 is sealed against the Ag/AgCl layer. Outside the sealing 208 an epoxy resin 204 is applied, thus screening the outside part of the Ag/AgCl electrode (the part not covered by the sealing 208 and the hydrogel 214) from the environment. Silicone 206 is applied partly covering the epoxy resin 204, the sealing 208, and the nafion or cellulose nitrate 212. An electrical contact 202 is in contact with the Ag/AgCl electrode 218 and allows to measure the potential of the electrode 218.

Increasing the stability of miniaturized reference electrodes is may be performed without increasing the volume of the reference electrolyte solution. Many studies on miniaturized reference electrodes have focused on the composition of the reference electrolyte solution (e.g. a hydrogel), and covering it with membranes to slow down the out diffusion of chloride ions. Besides these efforts there is still room for improving the stability of miniaturized reference electrodes.

SUMMARY

It is an object of embodiments of the present disclosure to provide reference electrodes with a limited, e.g. minimized, drift.

The above objective is accomplished by a method and device according to the present disclosure.

In a first aspect, the present disclosure provides a reference electrode for, in operation, being immersed in a bulk solution under test, together with an ion-selective electrode, so as to generate an electrical signal, for instance a voltage, that scales with the concentration of an ion to be determined. The reference electrode according to the present disclosure comprises a reservoir having reservoir walls defining a reservoir volume filled with an electrolyte, and an electrode in the reservoir, in contact with the electrolyte. The reservoir is closed except for the presence of at least one pore in at least one of the reservoir walls, such as the bottom, a side wall or possibly even a top wall; the at least one pore being filled with electrolyte and being adapted for allowing ionic contact between the electrolyte in the reservoir and the bulk solution into which the reference electrode is to be immersed.

Some embodiments of the present disclosure include that, while the reference electrode is immersed in a bulk solution, the electrolyte in the reservoir of the reference electrode is in ionic contact with the bulk solution. Furthermore, some embodiments of the present disclosure include that the pore enables an ionic contact between the electrolyte and the bulk solution while limiting the diffusion of the ions out of the electrolyte. In an example embodiment, the reservoir is closed except for the presence of at least one pore, as this limits the diffusion of ions out of the electrolyte.

In a reference electrode according to embodiments of the present disclosure, the ratio between the pore cross-sectional area A multiplied with the diffusion coefficient D of the ions in the electrolyte, on the one hand, and the pore length L multiplied with the reservoir volume $V_{res}$, on the other hand, is smaller than 1:

$$(D*A)/(L*V_{res})<1.$$

Some embodiments of the present disclosure include that the diffusion of the ions through the pore can be limited by selecting appropriate pore dimensions. Furthermore, the stability of the reference electrode according to embodiments of the present disclosure can be designed by choosing appropriate pore dimensions in combination with an appropriate volume of the reservoir.

In a reference electrode according to embodiments of the present disclosure, the reservoir walls may include a substrate, a side wall positioned on the substrate, and a cap positioned on the side wall, such that the substrate, the side wall and the cap together enclose the reservoir. In embodiments of the present disclosure, the side wall may be formed by a piece of material, for instance semiconductor material, into which a hole is etched, which piece of material is placed onto the substrate. The walls of the hole form the sidewall of the reservoir. In particular embodiments, the substrate and the side wall may be integrally made, i.e. they may be made from the same piece of material. Some embodiments of the present disclosure include that the reference electrode can be produced using standard etching and microfabrication techniques.

In embodiments of the present disclosure, the at least one pore may be located in the substrate. For example, the pore can be produced using standard etching techniques.

In these or alternative embodiments of the present disclosure, the at least one pore may be located in the side wall. In such a scenario, the pore can be produced using etching or molding techniques.

In the above or alternative embodiments of the present disclosure, the at least one pore may be located in the cap. The at least one pore can be produced using etching or molding techniques.

In embodiments of the present disclosure, the at least one pore may have a meandering structure. As such, the length of the pore can be increased. Enlarging the length of the pore results in a decrease of diffusion of the ions out of the electrolyte. Thus, it is possible to increase the stability of the reference electrode without having to increase the volume of the reservoir. By increasing the length of the meandering pore it is also possible to decrease the volume of the reservoir, and thus the volume of the reference electrode, while maintaining or even improving the stability of the reference sensor compared to a sensor without a meandering pore.

In embodiments of the present disclosure, the electrode may be made of AgCl. Alternatively, the electrode may be made of a metal oxide or a metal. In some embodiments, the same material can be used for the electrode of the reference electrode as for the ion sensor (e.g. pH sensor). Metal oxides such as ruthenium oxide (RuO) and iridium oxide (IrO) are pH sensitive and therefore the same material can be used for the pH ion sensor as well as for the reference electrode. In the case of pH sensitive metal oxides, the electrolyte is a pH a solution with constant pH, for example pH 7. In some embodiments, the long term stability of a reference electrode may be better when the electrode is made of a metal oxide than when the electrode is made of AgCl and the electrolyte is a chloride solution.

In a reference electrode according to embodiments of the present disclosure, the electrolyte may be a hydrogel. The diffusion of a hydrogel through a pore may be slower than the diffusion of a water-based fluid.

In a second aspect, the present disclosure provides a method for producing a reference electrode. The method comprises creating a reservoir, the reservoir comprising a pore, whereby the reservoir is open on one side; providing an electrode in the reservoir; filling the reservoir with an electrolyte; and thereafter closing the reservoir. In an example embodiment, the pore is filled with electrolyte through capillary forces when filling the reservoir with the electrolyte. A filled pore guarantees a good ionic contact between the electrolyte and the bulk solution when the reference electrode is immersed in the bulk solution.

In accordance with embodiments of the present disclosure, creating a reservoir comprising a pore may comprise etching, by means of deep reactive ion etching, a pore in a first surface of a substrate; applying a protection layer at least at the inside of the pore, the protection layer not covering a second surface of the substrate remote of the first surface; applying a potassium hydroxide (KOH) etching step to the second surface of the substrate; and thereafter removing the protection layer for opening the pore. A well-defined pore can be realized even when the substrate is too thick for obtaining a well-defined pore using KOH etching alone.

Alternatively, creating a reservoir comprising a pore may comprise obtaining a substrate and sealing a side wall onto the substrate such that a pore is present in the side wall. The pore may have been formed in the sidewall, e.g. by moulding or etching, before sealing it onto the substrate, or the pore may be formed in the sidewall, e.g. between the sidewall material and the substrate, due to the shape of the sidewall and its positioning onto the substrate. In some embodiments, the pore is created by sealing the side wall against the substrate. Creating a shallow microfluidic channel (e.g. through etching) on either the reservoir wall or the substrate is sufficient to create a pore in the reservoir wall. Compared to etching a pore through the substrate, no deep etching of a pore is required in this case. Moreover this method allows to create a meandering pore in the side wall.

In a method according to embodiments of the present disclosure, closing the reservoir may comprise placing and sealing a cap on the reservoir or sealing the reservoir by means of a droplet of glob top or epoxy.

In a third aspect, the present disclosure provides ion sensor for sensing an ion concentration in a bulk solution. The ion sensor comprises a reference electrode according to any embodiments of the first aspect of the present disclosure, a first electrode which is ion-selective for the ion to be measured, and a second electrode which is ion-selective to the reference ions in the electrolyte or to an ion different from the ion to be measured. The first electrode and the second electrode are adapted for being in direct contact with the bulk solution when the ion sensor is immersed in the bulk solution. The ion sensor further comprises a controller for determining a first potential difference between the first electrode and the reference electrode as a measure for the ion concentration in the bulk solution, and for correcting this first potential difference between the first electrode and the reference electrode with a second potential difference between the second electrode and the reference electrode for compensating for a drift of the reference electrode.

In an example embodiment, the drift of the reference electrode can be improved without a need for increasing the volume of the electrolyte in the reference sensor. As an example, the volume of the electrolyte in the reference electrode can be in the order of microliters. In some embodiments, the drift of the reference electrode can be directly measured and compensated for by means of a measurement on a second electrode in contact with the bulk solution. This allows reducing the volume of the electrolyte in the reference electrode even more. In embodiments of the present disclosure the second electrode is ion-selective to the reference ions. In this case, the voltage difference between the second electrode and the reference electrode is a measure for the concentration difference of the reference ions in the electrolyte in the reference electrode and the reference ions in the bulk solution. This concentration difference is a driving force for the drift. Therefore, when immersing the ion sensor in a bulk solution, the voltage difference between the second electrode and the reference electrode is a measure for the drift the reference electrode will experience. When the voltage difference is reaching 0V the reference sensor has equilibrated with the bulk solution and no drift is expected anymore. Miniaturized ion sensors can be made that can be used in applications for which conventional reference electrodes are not suited, because they are too large and rigid. Ion sensors can for example be miniaturized such that they can be used in sweat patches, or they can be positioned near a wound for smart wound monitoring, or they can be integrated in diapers. In some embodiments, the drift of the reference electrode can be compensated by measuring the potential difference between the second electrode and the reference electrode, the reference electrode being the same as the one used for measuring the potential difference with respect to the first electrode. The second electrode may be ion-selective for the reference ion. Both the second electrode and the reference electrode may for example be made of the same material, the present disclosure, however, not being limited thereto. When the ion sensor is immersed in the bulk solution, the concentration of the reference ion in the electrolyte in the reference electrode might change because of diffusion of the reference ion into the bulk solution. This concentration change causes the voltage of the reference electrode to drift. This drift can be compensated with the second electrode which is in direct contact with the bulk solution.

Particular and preferred aspects of the disclosure are set out in the accompanying independent and dependent claims. Features from the dependent claims may be combined with features of the independent claims and with features of other dependent claims as appropriate and not merely as explicitly set out in the claims.

These and other aspects of the disclosure will be apparent from and elucidated with reference to the embodiment(s) described hereinafter.

BRIEF DESCRIPTION OF THE FIGURES

FIG. 9 (b) shows two pictures of an actual implementation of the reference electrode schematically drawn in FIG. 9 (a); a top view and a bottom view of the reference electrode are shown. FIG. 9 (c) shows processing steps according to embodiments of the present disclosure for obtaining a pore in a substrate.

Figure 1:
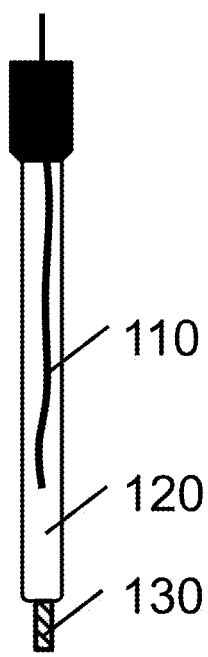
FIG. 1 shows a reference electrode.
Figure 2:
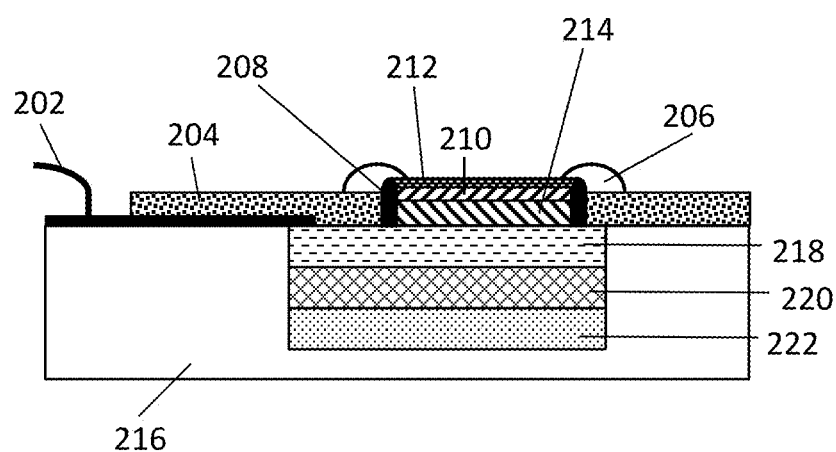
FIG. 2 shows a miniaturized reference electrode.

The drawings are only schematic and are non-limiting. In the drawings, the size of some of the elements may be exaggerated and not drawn on scale for illustrative purposes.

Any reference signs in the claims shall not be construed as limiting the scope.

DETAILED DESCRIPTION

The present disclosure will be described with respect to particular embodiments and with reference to certain drawings but the disclosure is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the disclosure.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the disclosure described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the disclosure described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present disclosure, the only relevant components of the device are A and B.

Reference throughout this specification to "one embodiment" or "an embodiment" means that a particular feature, structure or characteristic described in connection with the embodiment is included in at least one embodiment of the present disclosure. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the disclosure, various features of the disclosure are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed disclosure requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those in the art. For example, in the following claims, any of the claimed embodiments can be used in any combination.

In the description provided herein, numerous specific details are set forth. However, it is to be understood that embodiments of the disclosure may be practiced without these specific details. In other instances, well-known methods, structures and techniques have not been shown in detail in order not to obscure an understanding of this description.

Where in embodiments of the present disclosure reference is made to the voltage of an electrode, reference is made to the voltage of that electrode with respect to a drift-less large reference electrode.

Where in embodiments of the present disclosure reference is made to "a bare electrode", reference is made to an electrode that is in direct contact with the bulk solution when it is immersed in the bulk solution.

Where in embodiments of the present disclosure reference is made to "an electrolyte", reference is made to a fluid containing dissolved ions in which charge is carried by the movement of ions. It is thereby important that the material of the electrode is selected such that charge transfer with the ions in the electrolyte is possible. The electrolyte can for example be water with a known salt composition, or water with a fixed chloride concentration. The corresponding electrode may be an Ag/AgCl electrode. The electrolyte can be in a hydrogel such as agarose or pHEMA with a known salt composition. The electrolyte can also be a buffer, which is a solution with a fixed pH. The corresponding electrode may be a metal oxide electrode (e.g. IrOx, RuO). In case of metal electrodes the corresponding electrolytes can for example be water containing ferrocene, ferrocene methanol, ruthenium hexamine, or quinhydrone. In an example embodiment, the metal electrodes may be made of, or covered by, an inert metal such as gold, platinum or carbon (Au, Pt, C).

Where in embodiments of the present disclosure reference is made to "a reference ion", reference is made to ions in the electrolyte which can have a charge transfer with the corresponding electrode in the reservoir.

Where in embodiments of the present disclosure reference is made to "a reservoir wall", reference is made to any physical wall defining and delimiting the reservoir volume. In embodiments of the present disclosure this may be a side wall, a substrate, or a cap.

In a first aspect, the present disclosure relates to a reference electrode 600, for example a miniaturized reference electrode. The reference electrode 600 can be used for generating a reference voltage when immersed in a bulk solution. Therefore, electrolyte in a reservoir 650 of the reference electrode 600 must be in ionic contact with the bulk solution when the reference electrode 600 is immersed in the bulk solution. In embodiments of the present disclosure this is realized by providing a pore 651 in at least one of the reservoir 650 walls whereby also the pore 651 is filled with the electrolyte. The pore 651 provides an ionic contact between the electrolyte in the reservoir 650 and the bulk solution but the pore 651, due to its dimensions, also prevents or limits diffusion of the reference ions of the electrolyte out of the reservoir 650. Except for the presence of the at least one pore 651, the reservoir 650 is closed, which may help maintain an electrolyte with a stable concentration of the reference ions in the reference electrode 600.

Figure 6:
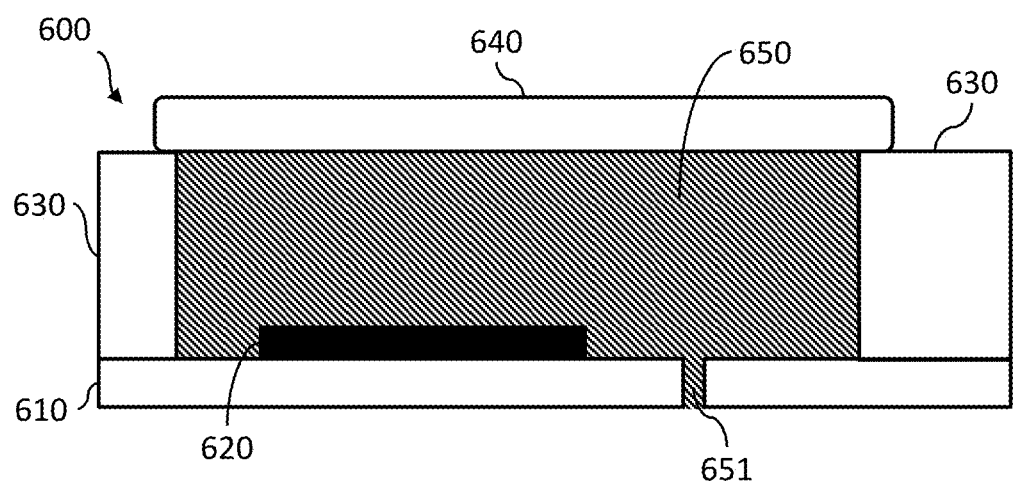
FIG. 6 is a schematic drawing of a reference electrode with a pore in the substrate in accordance with embodiments of the present disclosure.

FIG. 6 shows a cross-section of a reference electrode 600 in accordance with embodiments of the present disclosure. The reference electrode 600 comprises a substrate 610, which may be made of, amongst others, silicon, glass, or a foil. In this example an electrode 620 is positioned on the substrate 610. Any position of the electrode 620 within the reservoir 650, however, is possible, as long as the electrode 620 is in contact with the electrolyte in the reservoir 650. In embodiments of the present disclosure the electrode 620 may be made of, amongst others, silver chloride or a metal oxide. Suitable materials are for example: iridium oxide (IrOx), ruthenium oxide (RuO), gold, platinum, carbon or another material that can undergo charge transfer with ions in the electrolyte in the reservoir 650. The pore 651 in the substrate 610 is also visible in FIG. 6. The diameter of this pore might be between 1 and 100 μm. The pore 651 in FIG. 6 is filled with the electrolyte filling the reservoir 650, and provides an ionic contact between the electrolyte and the bulk solution in which the reference electrode 600 is immersed. The pore 651 is configured, e.g. by its shape and/or dimensions, for preventing diffusion from ions in the electrolyte in reservoir 650 to the bulk solution or vice versa, thereby limiting concentration changes of the electrolyte. Accordingly, the drift of the voltage generated by the reference electrode 600 may be limited. In the example of FIG. 6 the side walls 630 of the reservoir 650 are made of polymer or plastic. The reservoir 650 is closed using a cap 640. In the embodiment illustrated in FIG. 6, the pore 651 is provided in the substrate 61. However, the present disclosure is not limited thereto, and in alternative embodiments of the present disclosure, not illustrated in the drawings, the pore might be located in the cap 640. The pore might be through the cap 640 or it might be located between the cap 640 and the side wall 630 (e.g. by creating a shallow channel in the cap 640 and closing it by means of the side wall 630, or by creating a shallow channel in the side wall 630 and closing it by means of the cap 640).

Figure 7:
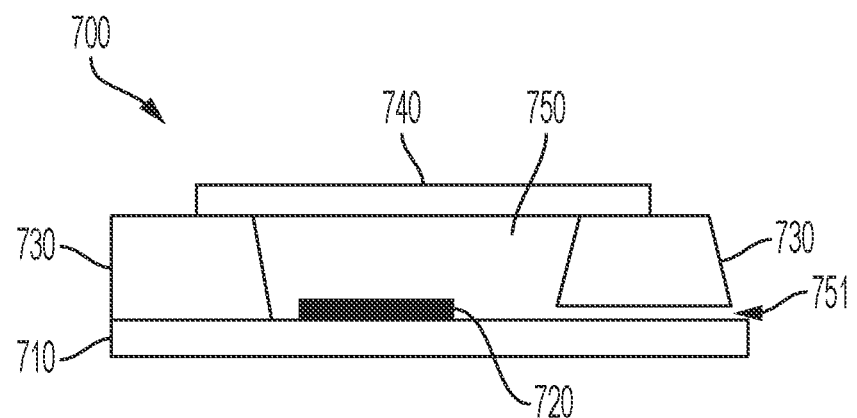
FIG. 7 (a) is a schematic side-view of a reference electrode with a pore in the side wall in accordance with embodiments of the present disclosure, and FIG. 7 (b) is a schematic top view of a reference electrode with a meandering pore in accordance with embodiments of the present disclosure.
Figure 7:
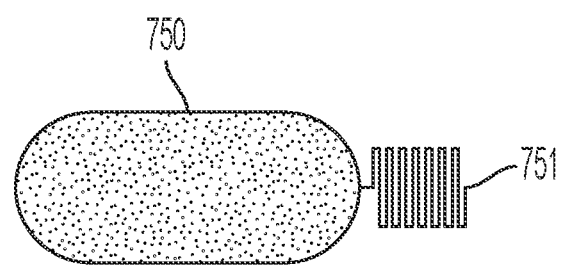

In other embodiments of the present disclosure a pore 751 is located in the side wall of the reference electrode 700. An example thereof is illustrated in FIG. 7. FIG. 7 (a) shows a substrate 710 on which an electrode 720 is mounted and on which the side walls 730 are mounted. In one of the side walls 730, a pore 751 is made connecting the outside of the reference electrode with the reservoir 750 of the reference electrode. The reservoir 750 is closed using a cap 740. In this example the reservoir 750 can be made using microfabrication. The side walls 730 may be made of glass and the reservoir 750 may be made using deep etching (e.g. HF etching), powder blasting, or laser drilling. The pore 751 may be a shallow microfluidic channel in the side wall 730, for instance made using HF etching. Connecting the side wall 730 containing the microfluidic channel with the substrate 710 results in the pore 751. In embodiments of the present disclosure, the side walls 730 may be made of a polymer, for example PDMS (polydimethylsiloxane). By molding liquid PDMS precursor on a silicon wafer with a pre-structured photoresist (e.g. SU-8) depicting the inverse of the reservoir 750 and the pore 751, the side walls 730 comprising a microfluidic channel can be made.

In alternative embodiments of the present disclosure, not illustrated in the drawings, a microfluidic channel may also be etched in a top surface of the substrate, resulting in a pore when covering the microfluidic channel with a side wall.

In embodiments of the present disclosure the pore 751 may be a meandering pore. This allows a pore with increased length. An example of such a meandering pore is illustrated in FIG. 7 (b) showing a horizontal cross-section of a reference electrode according to embodiments of the present disclosure. On the figure the reservoir 750 and the meandering pore 751 are visible. In some embodiments, the meandering pore 751 has a length which is longer than the width of the side wall of the reference electrode. Embodiments of the present disclosure may comprise a plurality of pores on different locations.

Figure 3:
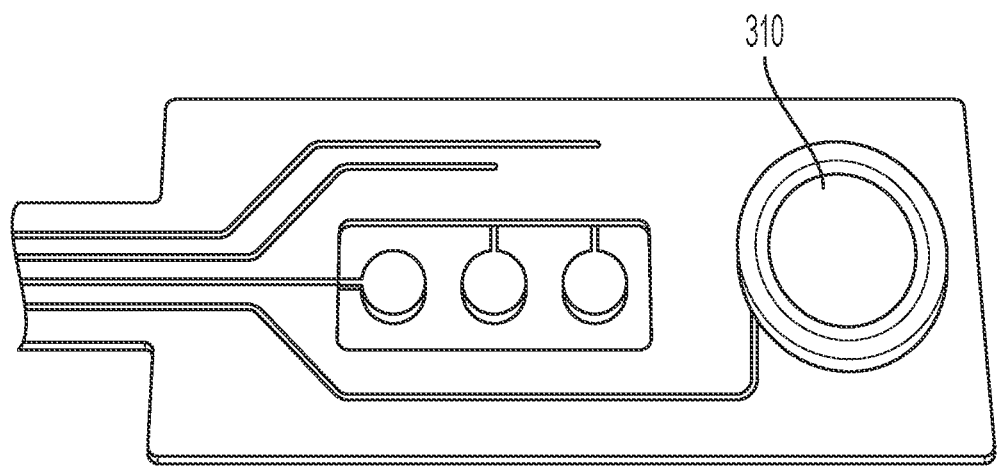
FIG. 3 shows a picture of an ion sensor comprising a miniaturized reference electrode and three bare AgCl electrodes.
Figure 4:
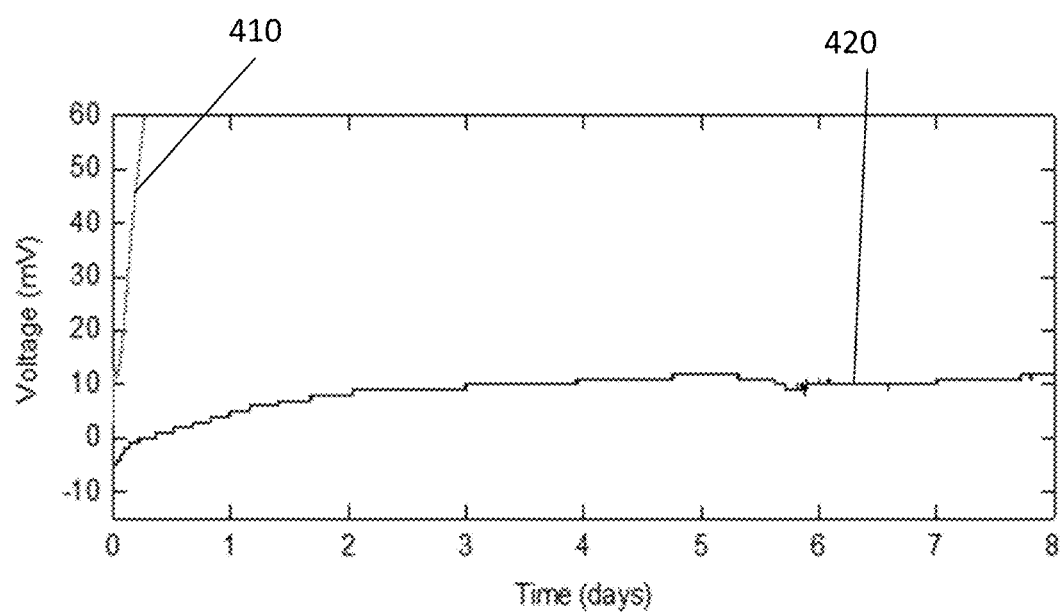
FIG. 4 shows the drift of a reference electrode in accordance with embodiments of the present disclosure and the drift of the reference electrode of FIG. 3 when immersed in a solution with a different chloride concentration than the chloride concentration in the reference electrolyte solution.
Figure 9:
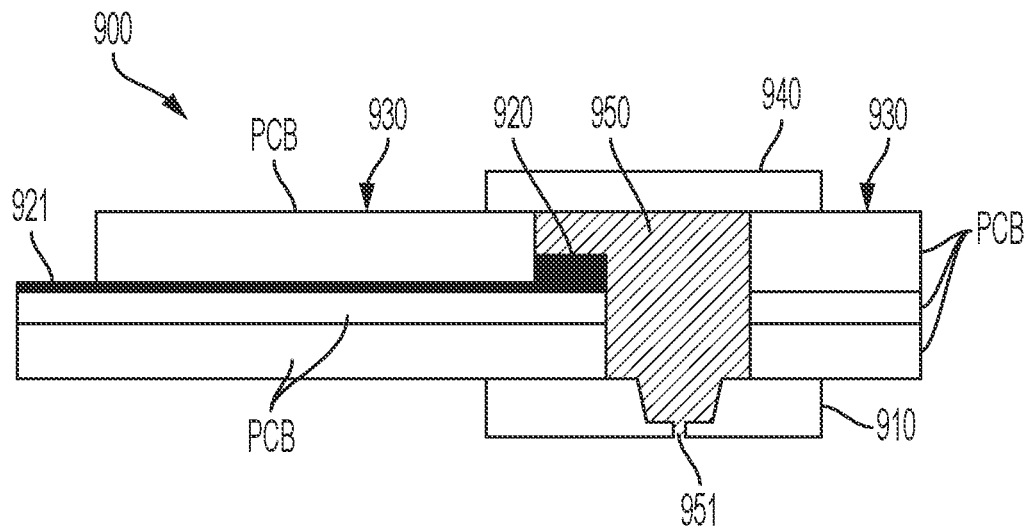
FIG. 9 (a) is a schematic drawing of a reference electrode comprising a printed circuit board, in accordance with embodiments of the present disclosure.
Figure 9:
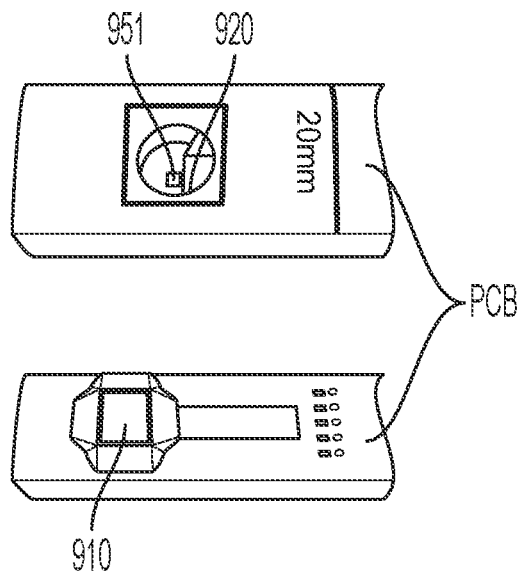
Figure 9:
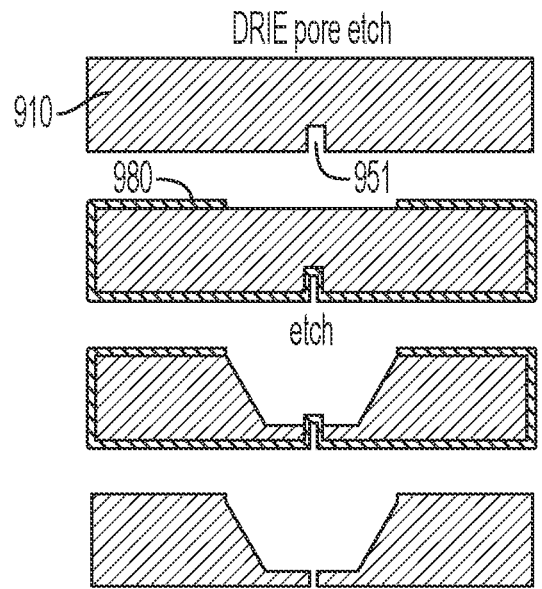

FIG. 4 shows the drift 420 of a reference electrode in accordance with embodiments of the present disclosure (the reference electrode illustrated in FIG. 9). FIG. 4 also shows the drift 410 of a reference electrode 310 (the reference electrode of FIG. 3). Both curves show the drift when the reference electrodes are immersed in a bulk solution with a chloride concentration of 0.1 M KCl, which differs from the chloride concentration in the electrolyte of the reference electrode (3 M KCl). Since the pore 951 of the reference electrode, according to embodiments of the present disclosure, slows down diffusion, the drift is limited to about 10 mV in 8 days as can be seen from curve 420. The curve 410 shows the drift of the reference electrode 310 embedded in an electrolyte 340. In an example embodiment, the drift is reduced compared to the reference electrode 310 of FIG. 3 where a drift of 60 mV is observed after a few hours.

Figure 10:
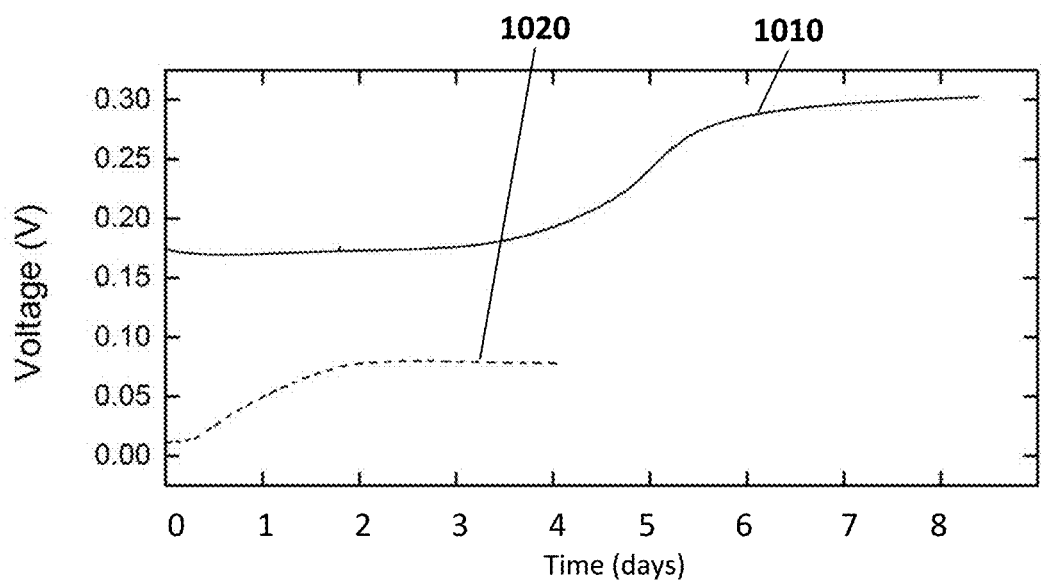
FIG. 10 shows the drift of reference electrodes in accordance with embodiments of the present disclosure. In one of the embodiments, the reference electrode is made of IrOx and in the other one the electrode is made of AgCl.

FIG. 10 shows the drift of reference electrodes 600 in accordance with embodiments of the present disclosure. Curve 1010 shows the drift of a reference electrode 600 when the electrode 620 is made of IrOx and immersed in a buffer solution, and curve 1020 shows the drift when the electrode 620 is made of AgCl and immersed in a KCl solution. IrOx is pH sensitive, which allows using the same material for the electrode 620 of the reference electrode 600 as for the ion-sensitive electrode 580 (see FIG. 5), for instance pH electrode, which implies easier processing when making an ion sensor. When the electrode 620 is made of IrOx the electrolyte in the reservoir 650 is a buffer with a constant pH (e.g. buffer with pH 7 in pHEMA gel). The reference electrode 600 with the electrode made of IrOx is conditioned in a pH 7 buffer and the stability of this reference electrode is measured by immersing it in a bulk solution with pH 4. The result is shown in FIG. 10 (curve 1010). For comparison, curve 1020 shows the drift of an AgCl reference electrode 600, according to the present disclosure, conditioned in 3M KCl and afterwards immersed in a 0.1 M KCl bulk solution. The electrode 620 made of metal oxide undergoes a reaction with the protons in the electrolyte (a buffer solution) and generates a stable voltage if a stable proton concentration can be established. In some embodiments, a buffer solution is used in the reservoir 650, since buffer solutions are resistant against pH changes.

The life-time of a reference electrode according to embodiments of the present disclosure is depending on the ratio between reservoir volume (amount of ions in mole) and the pore dimensions (out-diffusion of ions in mole/sec). This ratio delivers a time-constant which represents the efficiency (lifetime) of the system. Although the absolute value of the lifetime is still depending on other parameters (diffusion coefficients), the time-constant can be used to compare different reservoir-pore geometries. The diffusion through the pore is proportional to the cross-sectional area and inversely proportional to the length (Fick's law of diffusion).

The drift in the reference electrode potential, in volt per time, can be expressed in concentration difference inside the reservoir per time if the sensitivity (in Volt per decade of concentration or V/pCl in case of a chloride solution) of the electrode of the reference electrode is known.

The following formula can be derived: Drift=$\Delta E/t$, where t is the time needed for the specific drift and according to the Nernst equation:

$$E=E0+RT/F*\ln(C) \text{ or } E=\text{sensitivity}*\log(C)+\text{constant}$$

and thus $\Delta E=\text{sensitivity}*\log(C_t/C_0)$ or $C_t=C_0*10^{(\Delta E/\text{sensitivity})}$.

$C_t$ is the concentration of the reference ion in the reservoir at time t and $C_0$ is the starting concentration of the reference ion (t=0) in the reservoir, in mole/liter.

When the drift is small and therefore the changes in concentration inside and outside the reservoir are small, the diffusion flux through the pore can be regarded as constant (driving force for diffusion $\Delta C_t = C_t - C_{out} = \text{constant} = \Delta C_0 = C_0 - C_{out}$)

This initial diffusion flux in mole/sec, through a linear pore with cross-section A (m$^2$) and length L (m) can then be described according to Fick's law of diffusion as:

$$J_0 = -D*A*\Delta C_0/L,$$

where D is the diffusion coefficient in m$^2$/sec. This means that the initial flux $J_0$ is only depending on the initial reservoir concentration and the aspect ratio of the pore (the fraction A/L), not on the reservoir size.

Figure 11:
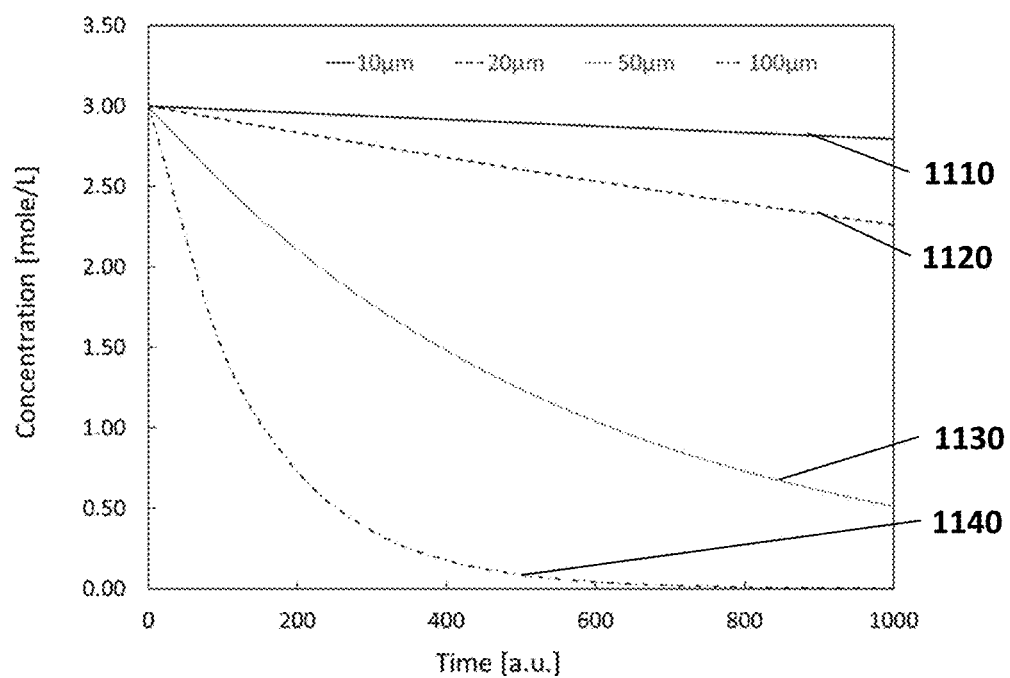
FIG. 11 shows the electrolyte concentration change in function of time in reference electrodes according to embodiments of the present disclosure. The different curves correspond with reference electrodes which have different pore sizes.

The curves in FIG. 11 show the concentration of the reference ion in the electrolyte in the reservoir 650 when the reference electrode 600 is immersed in a bulk solution with a lower concentration of the reference ion concentration. Curve 1110 corresponds with a reference electrode with a pore diameter of 10 µm, curve 1120—20 µm, curve 1130—50 µm, curve 1140—100 µm. The length of the pores 651, and the volume of the reservoirs 650 is the same for the different reference electrodes used in this experiment. As can be seen from FIG. 11 the concentration of the reference ions decreases the fastest for the reference electrodes with the largest pore diameter.

The concentration of the reference ion in the reservoir 650 as function of time (in the more or less linear starting part of the curves in FIG. 11) is the initial amount of ions minus what has diffused out, divided by the reservoir volume:

$$C_t = (C_0 * V_{res} - J_0 * t)/V_{res} \text{ or } C_t = C_0 + D * t * \Delta C_0 * (A/(L * V_{res}))$$

where $V_{res}$ is the reservoir volume in m$^3$ and the fraction $(A/(L*V_{res}))$ is describing the overall geometry of the reservoir/pore system. Substituting the two formulas for Ct gives $$t = (C0 * (1 - 10^{\wedge}(\Delta E/\text{sensitivity})))/(D * \Delta C_0 * (A/L * V_{res}))$$

The life time for a specific geometry is then depending on the chosen acceptable drift (ΔE), the diffusion coefficient and the starting concentrations inside and outside the reservoir. Or the other way around: for a given acceptable drift (ΔE), diffusion coefficient and starting concentrations inside and outside the reservoir 650, a reservoir 650/pore 651 system according to embodiments of the present disclosure can be described by the geometry $A/(L*V_{res})$. Different geometries can therefore directly be compared using the $A/(L*V_{res})$ fraction.

If a drift of 5 mV in one month is regarded stable and the sensitivity of the ion sensor is around 50 mV/decade (Nernstian behavior), this means that the acceptable relative decrease in concentration is:

$$(1 - 10^{\wedge}(-5/50)) * 100\% = 20\%$$

Considering a linear decrease in concentration in the reservoir 650 (constant diffusion flux), this means that the time-constant of the system should be 5 months. In reality, the diffusion over longer time is not constant. As can be seen from the curves in FIG. 11 the diffusion decreases when the internal reservoir concentration lowers. The real lifetime of the system will therefore be longer than estimated.

An example of two different reference electrodes 600, 700 according to embodiments of the present disclosure, which have different geometries, is described below. These reference electrodes can be compared using the $A/(L*V_{res})$ fraction. The first reference electrode 600 has a pore 651 which is limited in pore length because of the fabrication (DRIE etching through substrate, e.g. reference electrode illustrated in FIG. 6). The second reference electrode 700 has a limited reservoir 750 size (e.g. when integrated in a glass wafer or molded in PDMS, e.g. reference electrode illustrated in FIG. 7) but large freedom in pore length. The first reference electrode 600 may have a 100 µm long pore 651 with a diameter of 10 µm and a 20 µL reservoir 650 and the second reference electrode 700 is comparable to a 2 µL on-chip reservoir 750 connected by a 6.5 mm long (meandering) pore with a width of 50 µm and a height of 10 µm. Both reference electrodes have a time-constant of about 5 months (assuming a diffusion coefficient of 2e−9 m$^2$/s).

In embodiments of the present disclosure the ratio between the pore and the cross-sectional area A multiplied with the diffusion coefficient D of the ions in the electrolyte and the pore length L multiplied with the reservoir volume $V_{res}$ is smaller than 1 $((D*A)/(L*V_{res})<1)$.

In a second aspect the present disclosure relates to a method for producing a reference electrode. The method comprises a step of creating a reservoir comprising a pore, whereby the reservoir is open on one side. The method comprises a step of providing an electrode in the reservoir. The method comprises filling the reservoir with an electrolyte and thereafter closing the reservoir.

Figure 8:
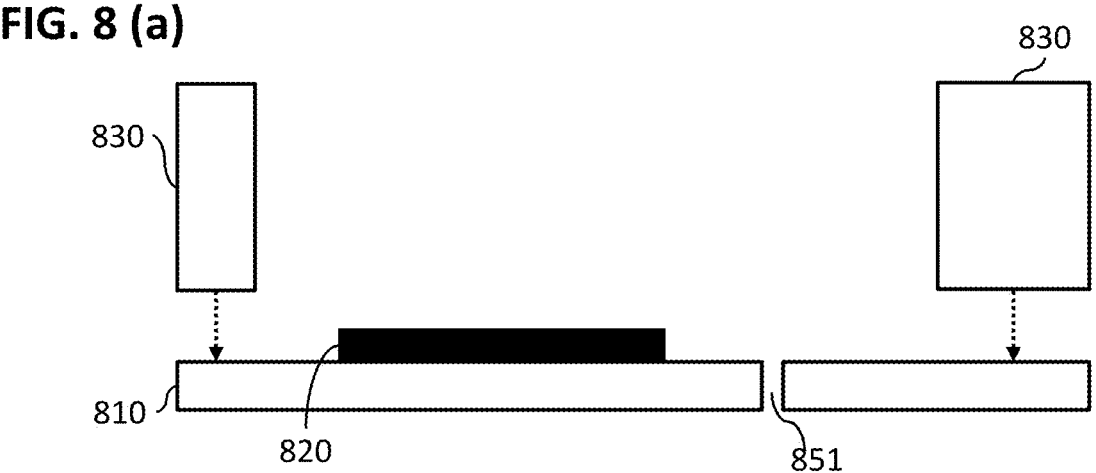
FIG. 8 (a), FIG. 8 (b), and FIG. 8 (c) show processing steps according to embodiments of the present disclosure for obtaining a reference electrode in accordance with embodiments of the present disclosure.
Figure 8:
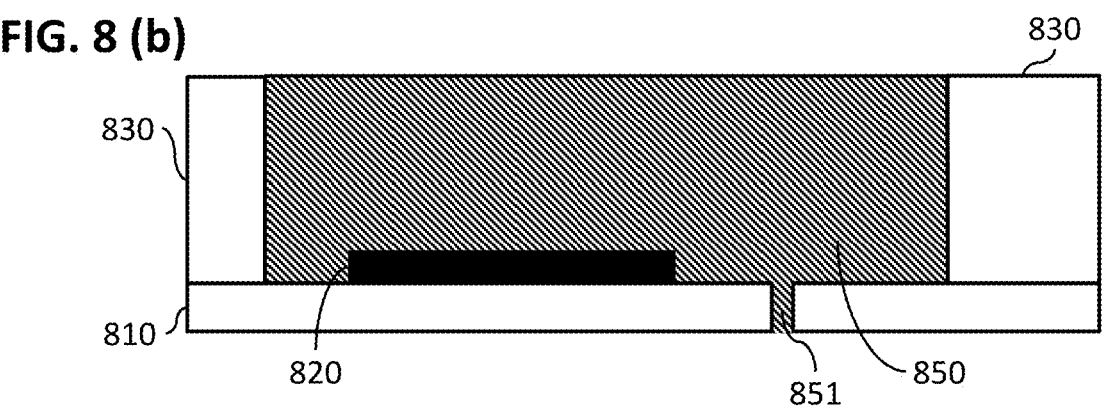
Figure 8:
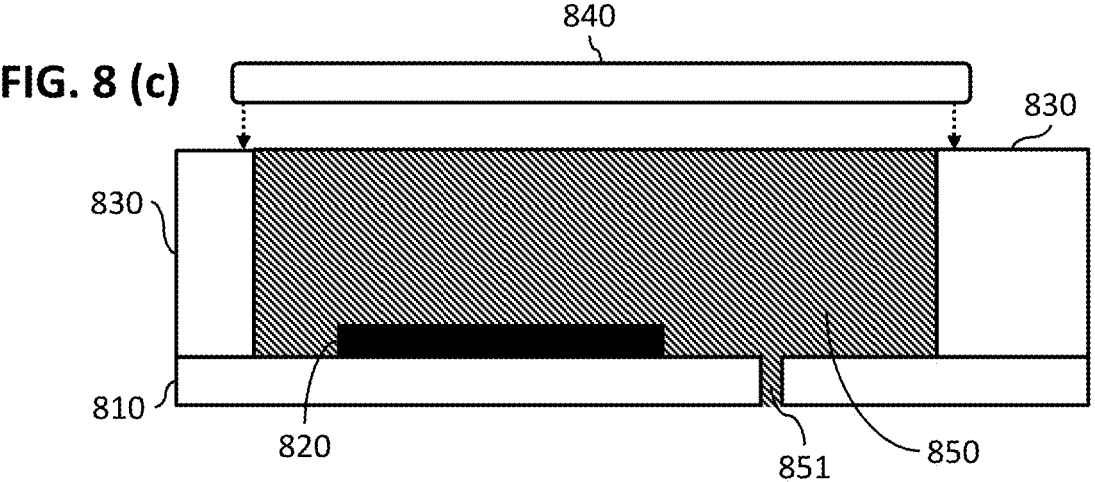

An example of this method is illustrated in FIG. 8. In step (a), a substrate 810 is provided comprising a pore 851 and comprising an electrode 820. The pore 851 is present in the substrate 810 and a reservoir is formed by positioning side walls 830 on the substrate 810. In step (b), the reservoir 850 is filled with an electrolyte (e.g. a buffer, water containing a fixed chloride concentration, agarose gel or pHEMA gel). The filling can be automated by for instance a dispensing robot. In at least some embodiments, the pore 851 is already present and comes in contact with the electrolyte when filling the reservoir 850 with the electrolyte. When coming in contact with the pore 851, capillary forces will guarantee that the pore 851 is filled with the electrolyte. Accordingly, in some embodiments, no air bubbles are trapped in the pore 851. Thus a good ionic contact between the electrolyte and the buffer solution can be guaranteed when the reference electrode, in operational use, will be immersed in the electrolyte. In a next step (c) the reservoir 850 is closed. This may be done using a cap 840. The cap 840 may be sealed to the side walls 830. The reservoir 850 may also be sealed by a droplet of glob top or another epoxy. In embodiments of the present disclosure the sealing is removable. The cap 840 might for example be removable. This allows to open the reservoir and to replace the electrolyte with a fresh solution to reset the device.

FIG. 9 (a) shows a cross-section of a reference electrode 900 according to embodiments of the present disclosure. In this example the side wall 930 is made of PCB (printed circuit board) material. The thickness of the PCB material may for example be between 2.5 mm and 3.5 mm. In this example the pore 951 is created in a semiconductor, e.g. silicon, substrate 910 using a combination of deep reactive ion etching (DRIE) and potassium hydroxide (KOH) etching. First the narrow pore is DRIE etched in the substrate 910 (first step in FIG. 9 (c)) in a first surface of the substrate 910. The pore 951 may have a diameter between 10 nm and 1000 µm and a depth between 1 µm and 10 cm. In an example embodiment, the diameter of pore 951 may be between 10 µm and 100 µm and the depth of pore 951 may be between 10 µm and 1000 µm. Next, a protection layer 980 for KOH etching, for instance a silicon nitride protection layer, is deposited (second step in FIG. 9 (c)) inside the pore and not covering parts of the second surface which are opposite to the pore 951, after which a KOH etching step is performed (third step in FIG. 9 (c)). Next the protection layer 980 is removed, thereby opening the pore 951 (fourth step in FIG. 9 (c)). In some embodiments, the KOH etching locally reduces the thickness of the wafer 910 to a thickness of about 100 µm as this allows to etch narrow (10-100 µm diameter) pores 951 through the substrate using for example DRIE etching. Using DRIE etching alone this would not be feasible, since the depth-width ratios are limited for DRIE etching. This ratio is around 10 and has a maximum of 20.

Etching a 10 μm pore through the full semiconductor, e.g. Si, wafer thickness (e.g. 650 μm), would therefore not be feasible.

Next, the side walls 930 are positioned on the substrate 910 and the thus formed reservoir 950 is closed with a cap 940. In the embodiment illustrated, the side walls 930 are made of stacked PCB boards. A conductive wiring 921 between two PCB boards provides a connection of the electrode 920 (e.g. AgCl electrode) to the outside of the reservoir 950. In embodiments of the present disclosure the conductive wiring 921 is made of a metal and it is made of, or covered with a noble metal (e.g. Au, Pt) to avoid corrosion. In an example embodiment, the conductive wiring 921 is completely covered with the electrode (e.g. AgCl) to avoid contact with the electrolyte in the reservoir 950. In the example, the reservoir 950 is filled with about 100 μL pHEMA gel containing 3M KCl and sealed with a cap 940 (see FIG. 9 (a)). In this example the cap 940 may be made of semiconductor material such as silicon; however, the present disclosure is not limited thereto. In this example the cap 940 does not have a pore. Since the pHEMA is not liquid anymore after curing, the reservoir 950 can also be closed by encapsulation with materials like epoxy glue or glob-top. FIG. 9 (b) show a picture of the top and a picture of the bottom of an actual implementation of a reference electrode 900 as in the drawing in FIG. 9 (a). In the top view the electrode 920 and the pore 951 are visible. In the bottom view the substrate 910 is visible.

Figure 5:
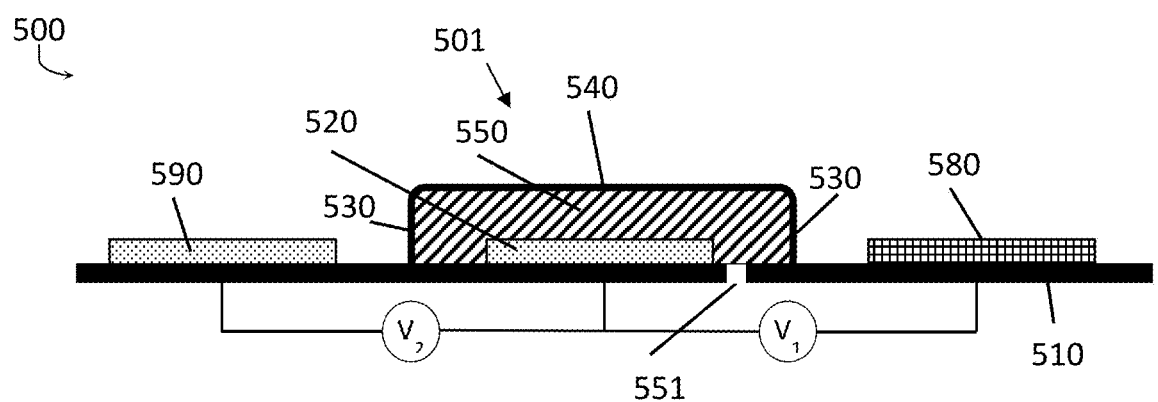
FIG. 5 is a schematic drawing of an ion sensor according to embodiments of the present disclosure, comprising a reference electrode and comprising two bare electrodes.

A schematic cross-sectional view of an ion sensor 500 according to embodiments of the present disclosure is shown in FIG. 5. FIG. 5 schematically shows an ion-sensor 500, with a reference electrode 501 according to embodiments of the present disclosure, and two bare electrodes 520, 530. The reference electrode 501 comprises a pore 551 providing an ionic contact between the electrolyte in the reservoir 550 of the reference electrode 501 and the outside world. In the embodiment illustrated, the pore 551 is provided through the substrate 510; however, this is not intended to be limiting for the present disclosure.

The ion sensor 500 as illustrated in FIG. 5 is shown to be integrated on a substrate 510. The reference electrode 501 comprises a reservoir 550 having reservoir side-walls 530 and a cap 540. The reservoir is thus delimited by the substrate 510 and the reservoir side-walls 530 and cap 540, and as such a reservoir volume is defined. The side walls 530 and cap 540 present around the reference electrolyte solution do not allow transport of ions therethrough. The reservoir is filled with an electrolyte. In the reservoir 550, an electrode 520 is present, in contact with the electrolyte. The reservoir 550 is closed (by substrate 510, walls 530 and cap 540), except for the presence of a pore 551. The pore 551 is filled with electrolyte and allows ionic contact, when in operational use, between the electrolyte in the reservoir 550 and a bulk solution into which the ion sensor 500 is immersed.

The material of the electrode 520 and the electrolyte in the reservoir 550 of the reference electrode 501 are chosen such that a voltage is induced on the electrode 520 of the reference electrode 501. This voltage is dependent on the concentration of a reference ion in the electrolyte. The electrode 310 may be any suitable electrode according to embodiments of the present disclosure, for example it may be made of Ag/AgCl. The electrolyte may be any suitable electrolyte, for instance a KCl solution, comprising Cl ions. The volume of the electrolyte in a miniaturized sensor implementation typically is not more than a few microliters.

The concentration of the chloride ion in the reference KCl solution will determine the reference potential of the electrode 501.

If the ion sensor 500, comprising a reference electrode 501 in accordance with embodiments of the present disclosure, is placed in a bulk solution with an ion concentration, for instance a chloride concentration, which is different from the reference ion concentration, for instance chloride concentration, in the electrolyte, an ion conductive path is present, through the pore 551, between the reference electrolyte solution and the bulk solution, and ions diffuse into or out of the electrolyte. The diffusion of ions alters the ion concentration in the electrolyte and leads to drift of the voltage of the reference electrode 501. Due to the limited dimensions of the pore, however, ion concentration shifts are limited, and life time of the reference electrode, and hence of the ion sensor, is improved.

In the example illustrated in FIG. 4, the reference sensor according to the present disclosure has an improved stability compared to the reference sensor used in the ion sensor of FIG. 3. Therefore an ion sensor comprising such reference sensor according to embodiments of the present disclosure, will also have an improved stability.

In the ion sensor 500, besides the reference electrode 501, an ion-selective electrode 580 is provided, which is selective for the ion to be measured. The ion-selective electrode 580 may for example be an ISFET (Ion Sensitive Field Effect Transistor). The ion-selective electrode 580 might for example be made of iridium oxide ($IrO_x$) which can be used for pH measurements. The ion-selective electrode 580 can also be an AgCl electrode covered by an ion-selective membrane or self-assembled monolayer. The ion-selective electrode 580 can be an AgCl electrode in contact with an electrolyte reservoir and separated by the sample solution by a glass membrane (thereby forming a pH sensor). The ion-selective electrode 580 can be an AgCl electrode in contact with an electrolyte reservoir and separated by the sample solution by a (solid-state) ion selective membrane.

In embodiments of the present disclosure, two potential differences are measured (see also FIG. 5): a first potential difference $V_1$ between the ion-selective electrode 580 and the reference electrode 501 (indicative for the ion concentration which needs to be determined) and a second potential difference $V_2$ between a second electrode 590 and the reference electrode 501 (proportional with the ion concentration difference between the reference electrolyte and the bulk solution; hence a measure for the drift of the reference electrode 501). When the second potential difference $V_2$ is measured over time, it gives an indication of the drift of the reference electrode 501.

In accordance with embodiments of the present disclosure, the drift of the reference electrode 501 may be compensated for by correcting the first potential difference $V_1$ between the ion-sensitive electrode 580 and the reference electrode 501 with the second potential difference $V_2$ between the second electrode 590 and the reference electrode 501. Such way of working is described in more detail in EP14199277.6, from the same applicant, co-pending herewith, and incorporated herein by reference.

In embodiments of the present disclosure the drift compensation may be performed over time by simple calculations, such as by subtracting the measured second potential difference from the first potential difference. More complex solutions which take into account the expected drift behavior are also possible, though. The drift may for example be expected to occur at a slow rate. Fast changes of the first and/or second potential difference between the second electrode and the reference electrode may therefore be neglected when compensating for the slow drift. They can for example be caused by changing the bulk solution with another bulk solution which has a different reference ion concentration.

The invention claimed is:

1. A reference electrode for being immersed in a bulk solution, the reference electrode comprising:
 a reservoir having reservoir walls defining a reservoir volume filled with an electrolyte, wherein the reservoir volume is from about 1 to about 1000 microliters;
 a single meandering planar channel formed on a surface of at least one reservoir wall of the reservoir walls, wherein the single meandering planar channel meanders side-to-side within edges of the at least one reservoir wall and within a plane of the surface; and
 an electrode arranged on the at least one reservoir wall, in contact with the electrolyte, wherein the reservoir is closed except for a presence of the single meandering planar channel, the single meandering planar channel being filled with electrolyte and being adapted for allowing ionic contact between the electrolyte in the reservoir and the bulk solution into which the reference electrode is to be immersed, and wherein a quantity $$(D \cdot A)/(L \cdot V_{res})$$

for the reference electrode is smaller than 1 sec$^{-1}$, where D is a diffusion coefficient of the ions in the electrolyte, A is a cross-sectional area of the single meandering planar channel, L is a length of the single meandering planar channel, and $V_{res}$ is a volume of the reservoir.

2. The reference electrode according to claim 1, wherein the reservoir walls comprise a substrate, a side wall positioned on the substrate, a cap positioned on the side wall, such that the substrate, the side wall and the cap together enclose the reservoir, wherein the at least one reservoir wall corresponds to the substrate.

3. The reference electrode according to claim 1 whereby the electrode comprises silver chloride.

4. The reference electrode according to claim 1 whereby the electrode comprises a metal oxide or a metal.

5. The reference electrode according to claim 1 wherein the electrolyte comprises a hydrogel.

6. A method for producing a reference electrode, the method comprising:
 creating a reservoir, the reservoir comprising a single meandering planar channel formed on a surface of at least one reservoir wall of the reservoir, whereby the reservoir is initially open on one side, and wherein the single meandering planar channel meanders side-to-side within edges of the at least one reservoir wall and within a plane of the surface;
 providing an electrode on the surface of the at least one reservoir wall;
 filling the reservoir with an electrolyte, wherein the single meandering planar channel is filled with electrolyte and allows for ionic contact between the electrolyte in the reservoir and a bulk solution into which the reference electrode is to be immersed, and wherein a quantity $$(D \cdot A)/(L \cdot V_{res})$$

for the reference electrode is smaller than 1 sec$^{-1}$, where D is a diffusion coefficient of the ions in the electrolyte, A is a cross-sectional area of the single meandering planar channel, L is a length of the single meandering planar channel, and $V_{res}$ is a volume of the reservoir; and
 thereafter closing the reservoir, wherein the volume of the reservoir is from about 1 to about 1000 microliters.

7. The method according to claim 6, wherein creating the reservoir comprising the single meandering planar channel comprises:
 etching, by means of deep reactive ion etching, the single meandering planar channel in a first surface of the at least one reservoir wall;
 applying a protection layer, wherein the protection layer covers at least an inside portion of the single meandering planar channel, and wherein the protection layer does not cover a second surface of the at least one reservoir wall, wherein the first surface is arranged opposite the second surface;
 etching, by means of hydroxide etching, the second surface of the at least one reservoir wall; and
 thereafter removing the protection layer for opening the single meandering planar channel.

8. The method according to claim 6, wherein closing the reservoir comprises placing and sealing a cap on the reservoir or sealing the reservoir by means of a droplet of glob top or epoxy.

9. An ion sensor for sensing an ion concentration in a bulk solution, the ion sensor comprising:
 a reference electrode according to claim 1, a first electrode which is ion-selective for an ion to be measured, a second electrode which is ion-selective to reference ions in the electrolyte or to an ion different from the ion to be measured;
 the first electrode and the second electrode being adapted for being in direct contact with the bulk solution when the ion sensor is immersed in the bulk solution; and
 a controller for determining a first potential difference between the first electrode and the reference electrode as a measure for the ion concentration in the bulk solution, and for correcting the first potential difference between the first electrode and the reference electrode based on a second potential difference between the second electrode and the reference electrode so as to compensate for a drift of the reference electrode.

* * * * *